United States Patent
McDonald et al.

(10) Patent No.: US 9,895,667 B2
(45) Date of Patent: Feb. 20, 2018

(54) CARBONATED FLUID DISPENSER WITH ULTRASONIC FOAMING MECHANISM

(71) Applicants: David Arlen McDonald, Merrimack, NH (US); Philip S Petracca, Howell, NJ (US); William Scott Keeley, Charlestown, RI (US)

(72) Inventors: David Arlen McDonald, Merrimack, NH (US); Philip S Petracca, Howell, NJ (US); William Scott Keeley, Charlestown, RI (US)

(73) Assignee: Fizzics Group LLC, Merimack, NH (US)

( * ) Notice: Subject to any disclaimer, the term of this patent is extended or adjusted under 35 U.S.C. 154(b) by 0 days.

(21) Appl. No.: 14/703,991

(22) Filed: May 5, 2015

(65) Prior Publication Data

US 2017/0266630 A1    Sep. 21, 2017

(51) Int. Cl.
*A47J 31/00* (2006.01)
*B01F 3/04* (2006.01)
(Continued)

(52) U.S. Cl.
CPC ............ *B01F 3/04446* (2013.01); *A23L 2/54* (2013.01); *B01F 3/04978* (2013.01); *B67D 1/04* (2013.01);
(Continued)

(58) Field of Classification Search
CPC ........ A47J 31/00; A47J 31/002; A47J 31/005; B67D 1/00; B67D 1/0043; B67D 1/0057;
(Continued)

(56) References Cited

U.S. PATENT DOCUMENTS 2,680,010 A * 6/1954 Dubay .................. B05B 7/0037
239/343
4,204,613 A   5/1980 Terzian
(Continued)

FOREIGN PATENT DOCUMENTS

CN          204251325 U    4/2015
DK    WO2008000271 A3    2/2008
(Continued)

OTHER PUBLICATIONS

Gizmodo.com Guinness Surger (Article title and article title) Gizmodo.com Mar. 14, 2006 Published on world wide web.

*Primary Examiner* — Michael Laflame, Jr.
(74) *Attorney, Agent, or Firm* — Keeley DeAngelo LLP; W Scott Keeley

(57) ABSTRACT

The embodiment relates to beverage dispensing, and more particularly to the dispensing of a carbonated beverage, from any container into a vessel, providing a portion of the beverage as foam atop the dispensed beverage. To avoid the reduction of absorbed carbon dioxide in a carbonated beverage, increased atmospheric pressure is employed to move the beverage from the container through the apparatus and into the vessel. An oscillating means provides a sonic wave through the conduit and the liquid therein; the sonic wave initiates the reaction between the carbon dioxide and the ingredients in the beverage to cause the liquid to foam prior to dispensing into the vessel. Iterations include an adaptable apparatus for a beer tap and a means for passing the liquid to be dispensed through a permeable container filled with soluble material or a permeable container filled with a filtration means.

18 Claims, 7 Drawing Sheets

(51) Int. Cl.
  *A23L 2/54* (2006.01)
  *B67D 1/08* (2006.01)
  *B67D 1/04* (2006.01)
  *B67D 1/12* (2006.01)

(52) U.S. Cl.
  CPC ......... *B67D 1/0894* (2013.01); *B67D 1/1275* (2013.01); *A23V 2002/00* (2013.01); *B01F 2003/049* (2013.01); *B01F 2215/0022* (2013.01); *B67D 2001/0493* (2013.01)

(58) Field of Classification Search
  CPC ...... B67D 1/0058; B67D 1/04; B67D 1/0406; B67D 1/0425; B67D 1/127; B67D 1/1275–1/1416
  USPC ........ 99/289 R, 299, 316, 323, 323.1–323.3; 426/474–477; 261/19, 24–30
  See application file for complete search history.

(56) References Cited

U.S. PATENT DOCUMENTS

| | | |
|---|---|---|
| 4,238,053 A | 12/1980 | Bonini |
| 4,279,938 A | 7/1981 | Hildebrand |
| 4,407,356 A | 10/1983 | DeLau |
| 4,494,600 A | 1/1985 | DeLau |
| 4,559,979 A | 12/1985 | Koblasz et al. |
| 4,599,872 A | 7/1986 | Rist |
| 4,610,888 A | 9/1986 | Teng |
| 4,720,076 A | 1/1988 | Hyde |
| 4,742,942 A | 5/1988 | Dokos et al. |
| 4,892,230 A | 1/1990 | Lynn, Jr. |
| 4,921,135 A | 5/1990 | Pleet |
| 5,031,831 A | 7/1991 | Williams, III |
| 5,062,548 A | 11/1991 | Hedderick et al. |
| 5,199,609 A | 4/1993 | Ash, Jr. |
| 5,240,144 A | 8/1993 | Feldman |
| 5,251,787 A | 10/1993 | Simson |
| 5,288,289 A | 2/1994 | Haak |
| 5,292,038 A | 3/1994 | Seney |
| 5,335,705 A | 8/1994 | Morishita et al. |
| 5,415,002 A | 5/1995 | Koenig |
| 5,454,406 A | 10/1995 | Rejret |
| 5,466,473 A | 11/1995 | Forage |
| 5,571,548 A | 11/1996 | Lynch et al. |
| 5,573,145 A | 11/1996 | Groh |
| 5,667,832 A | 9/1997 | Tromans |
| 5,683,732 A | 11/1997 | Baxter et al. |
| 5,947,378 A | 9/1999 | Rebotier |
| 5,980,959 A | 11/1999 | Frutin |
| 6,131,763 A | 10/2000 | Stanish et al. |
| 6,199,386 B1 | 3/2001 | Garrett |
| 6,457,614 B1 | 10/2002 | Amidzich |
| 6,546,737 B1 | 4/2003 | Heyes et al. |
| 7,281,392 B2 | 10/2007 | Liu |
| 7,367,479 B2 | 5/2008 | Sitz |
| 7,478,583 B2 | 1/2009 | Scullion et al. |
| 7,810,679 B2 | 10/2010 | Wauters |
| 8,038,039 B2 | 10/2011 | Kelly |
| 8,066,152 B2 | 11/2011 | Tetreault |
| 8,162,011 B2 | 4/2012 | Weems |
| 8,167,173 B1 | 5/2012 | Simmonds |
| 8,453,882 B2 | 6/2013 | Johnson |
| 8,522,968 B2 * | 9/2013 | Middleman ............ A47G 21/00 206/219 |
| 8,657,262 B2 * | 2/2014 | Burri ................... A47J 31/4485 261/26 |
| 8,777,067 B2 | 7/2014 | Trulaske |
| 8,931,651 B2 | 1/2015 | Van Hove |
| 9,297,575 B1 | 3/2016 | Gardner |
| 2002/0088823 A1 | 7/2002 | Tabacchi et al. |
| 2002/0130137 A1 | 9/2002 | Greenwald et al. |
| 2007/0204930 A1 | 9/2007 | Phallen et al. |
| 2009/0047402 A1 * | 2/2009 | Schodler ............. A47J 31/4489 426/474 |
| 2010/0127015 A1 | 5/2010 | Boyer |
| 2010/0158489 A1 | 6/2010 | Siu |
| 2012/0035761 A1 | 2/2012 | Tilton et al. |
| 2013/0064941 A1 | 3/2013 | Taitler |
| 2014/0097549 A1 * | 4/2014 | Hoare ...................... A23L 2/54 261/30 |
| 2014/0175682 A1 * | 6/2014 | Johnson .................. A61L 9/127 261/30 |

FOREIGN PATENT DOCUMENTS

| | | |
|---|---|---|
| GB | EP19950303174 A2 | 11/1995 |
| JP | H07101497 A | 4/1995 |
| WO | WO2015/005474 A1 | 2/2015 |

* cited by examiner

CARBONATED FLUID DISPENSER WITH ULTRASONIC FOAMING MECHANISM

This application claims priority to provisional application No. 62/177,346.

TECHNICAL FIELD

The present disclosure relates in general to beverage dispensing, and more particularly to the dispensing of a carbonated beverage from any container into a glass, providing a portion of the beverage as foam atop of the dispensed beverage.

BACKGROUND

Although any carbonated beverage may produce a foam layer on top of its poured contents, the foam layer on a poured serving of beer is of particular interest to many consumers. The foam layer, referred to as a head, atop a vessel of beer is produced by bubbles of gas, commonly carbon dioxide, that rise to the surface. The compounds that produce the head comprise proteins, yeast and starches in the form of grain residue in the beer. The interaction between the carbon dioxide the proteins and starches in the liquid determine the physical properties of the foam. Carbon dioxide may be produced during fermentation or if the beer is pasteurized it may be carbonated by injecting pressurized gas after pasteurization. Of particular interest to consumers is the density and longevity of the head. As with many reactions, agitation can increase the rate of reaction. Although it is common to produce a head on top of a glass of beer, similarly, foam may also be produced from carbonated soft drinks, carbonated juices or non-alcoholic malt beverages.

It is commonly considered that a greater-than-desired volume of head on the beverage detracts from the mass of the drink, while some head is considered essential to the beverage. The head gives off an aroma of the beer/beverage, and adds to the experience of enjoying the beverage. The production of the head reduces the amount of carbon dioxide in the remainder of the beverage.

While many methods exist for providing a stable, dense head on beer dispensed from casks or pressurized bulk containers, it has long been understood that there are problems associated with attempting to achieve the same effect on beer dispensed from bottles, cans or common single-serve containers. There is a need for a means and apparatus to produce a fine, dense head on a dispensed beer from a variety of disparate containers.

SUMMARY

In accordance with embodiments of the present disclosure, an apparatus and method, in general, for dispensing a liquid, including a carbonated beverage such as beer; and in particular, for dispensing a portion of the beverage without altering the concentration of pressurized gas in the beverage; and further, for dispensing a portion of the beverage in the form of a fine, dense head of foam. One skilled in the art will understand that a variety of liquids may be dispensed in a foamed state, and that while it may be desirable to dispense a portion of the liquid in a non-foamed state and a portion of the liquid in a foamed state, in other applications it may be desirable to dispense the entirety of the contents in a foamed state or the entirety of the contents in a non-foamed state.

In one embodiment the apparatus comprises a base for supporting a container such as a glass or mug or the like. Engaged with the base is a body providing a chamber, closed on all but one side, suitable for housing a beverage container such as a can, bottle, jug or the like. An upper housing is engaged with the body, in a manner wherein a fluid-tight seal may be obtained between the body and the upper housing at the open end of the body.

A fluid path, or conduit, extends from the interior of the body into the upper housing and terminates at a spout that is proximal to the top of the glass to be filled with the dispensed liquid. The liquid in the beverage container is moved through the conduit by increasing the air pressure in the body, thus moving the liquid by the property of displacement. In the region proximal to the spout an oscillation means produces a sonic wave through the conduit and hence through the liquid being dispensed. The oscillation's agitation of the liquid increases the reaction that produces foam or head. Small rapid oscillations tend to produce a fine, dense foam.

One skilled in the art will understand that the end result achieved by a control circuit employed to send an electrical current to a solenoid valve may also be achieved by a manually operated valve and subsequent substitutions of mechanical operators to an electronic system. In other words, although the same means may be achieved by a mechanical apparatus, the following embodiment is described as having an electronic controller.

Other objects and features will become apparent from the following detailed description considered in conjunction with the accompanying drawings. It is to be understood, however, that the drawings are designed as an illustration and not as a definition of the limits of the invention.

BRIEF DESCRIPTION OF THE DRAWINGS

To assist those of skill in the art in making and using the disclosed beverage dispenser and associated methods, reference is made to the accompanying figures, wherein.

DESCRIPTION

As discussed in greater detail below, an apparatus and method providing dispensed liquid and dispensed, foamed liquid is described. In general, a beverage container is placed in the body with the conduit inserted into the liquid that is in the container. With the upper housing closed and creating a fluid-tight, or in this case, an air-tight seal, over the open side of the body, the control lever may be moved in the first direction wherein the pump increases the air pressure inside the body. The increased air pressure in the body moves the beverage by the property of displacement, through the conduit and into the container. When the lever is moved to a second position the high frequency oscillation means produces a sonic wave through the conduit and hence through the liquid being dispensed. The high frequency produces a fine, dense foam that floats on top of the dispensed beverage. The lever may subsequently be moved to a third position wherein the control circuit opens a valve so as to dispel the relatively higher pressure air in the interior of the body, thus returning the pressure to that of the ambient pressure.

Figure 1:
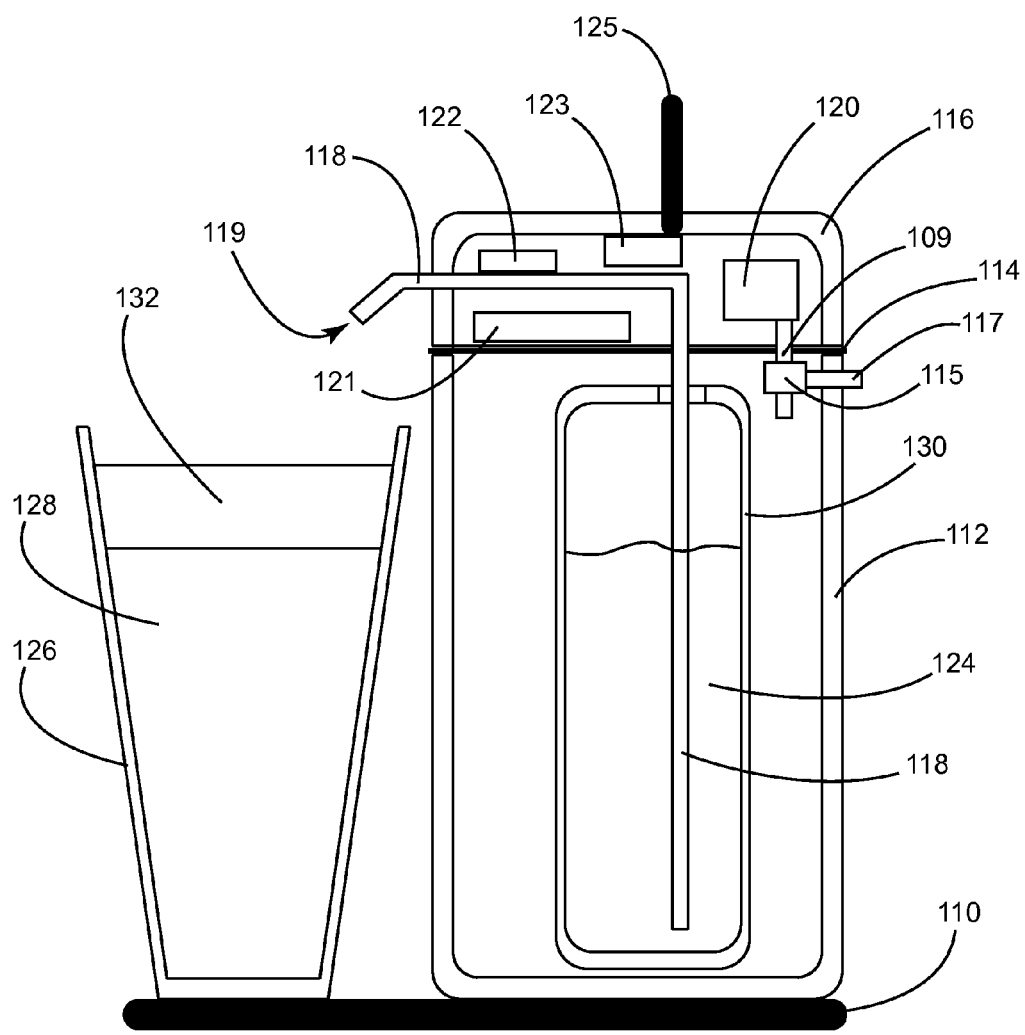
FIG. 1 is a diagram depicting the arrangement of components of an example embodiment

Referring to FIG. 1, an example embodiment 100 comprises a base 110 engaged with a body 112 that is further engaged by way of a gasket 114 with an upper housing 116. One skilled in the art will understand that there are a number of methods for securing the upper housing with the body such as methods including threaded or clamping closure methods.

The body 112 is a hollow chamber closed on all but one side. The open side is engaged with a gasket 114 which is further engaged with the upper housing. A conduit 118 extends from the proximal end in the interior of the body 112 where it is intended to be inserted into the liquid 124 to be dispensed, through the upper housing where the distal end forms a spout 119. The upper housing 116 contains a control lever 125, a power source 121, a pump 120, a valve 115, a high frequency oscillation means, otherwise referred to as an oscillator 122, and a control circuit 123. The control circuit 123 directs power to the aforementioned components to achieve the following described method.

A beverage container 130 is inserted into the body 112 and the conduit 118 is inserted into the beverage 124. The upper housing 116 is closed over the body 112 and sealed against the gasket 114. The operation means or lever 125, is moved to the position relative to the dispensing of the liquid. The control circuit 122 turns the valve 115 to allow air from the pump 120 into the interior of the body 112. The control circuit 122 then turns on the pump 120 that transfers air into the interior of the body 112. As the air pressure increases inside the body 112, the liquid in the beverage container 124 is moved through the conduit 118 by the property of displacement, and out the spout 119, into the glass 126. When the user chooses to create a foamed liquid, the lever 125 is moved to the position relative to the foaming of the liquid. The control circuit 123 turns on the oscillator 122 that produces an oscillatory wave through the conduit 118 and hence through the carbonated liquid, thus causing it to foam. The oscillatory wave agitates the liquid, increasing the reaction between the carbon dioxide and the proteins and starches in the liquid producing foam 132 that floats on top of the dispensed liquid 128. When the beverage and foam have been dispensed, the lever 125 is moved to a neutral position wherein the control circuit 123 switches the valve 115 to open the purge conduit 117 so that the pressure in the body 112 exits through the purge conduit 117, thus returning the pressure inside the body 112 to that of the ambient environment. The upper housing is opened and the empty beverage container 130 removed.

In an iteration of the embodiment, a beverage container is placed in the body with the conduit inserted into the liquid that is in the container. With the upper housing closed and creating a fluid-tight, or in this case, an air-tight seal, over the open side of the body, air is pumped into the interior of the body wherein the increased the air pressure moves the beverage by the property of displacement, through the conduit and into the container. A switch sends power to a high-frequency oscillation means produces a sonic wave through the conduit and hence through the liquid being dispensed. The high frequency waves produce a fine, dense foam that floats on top of the dispensed beverage. A manually operated valve is opened to dispel the relatively higher pressure inside the body so that the air in the interior of the body may return to ambient pressure.

Figure 2:
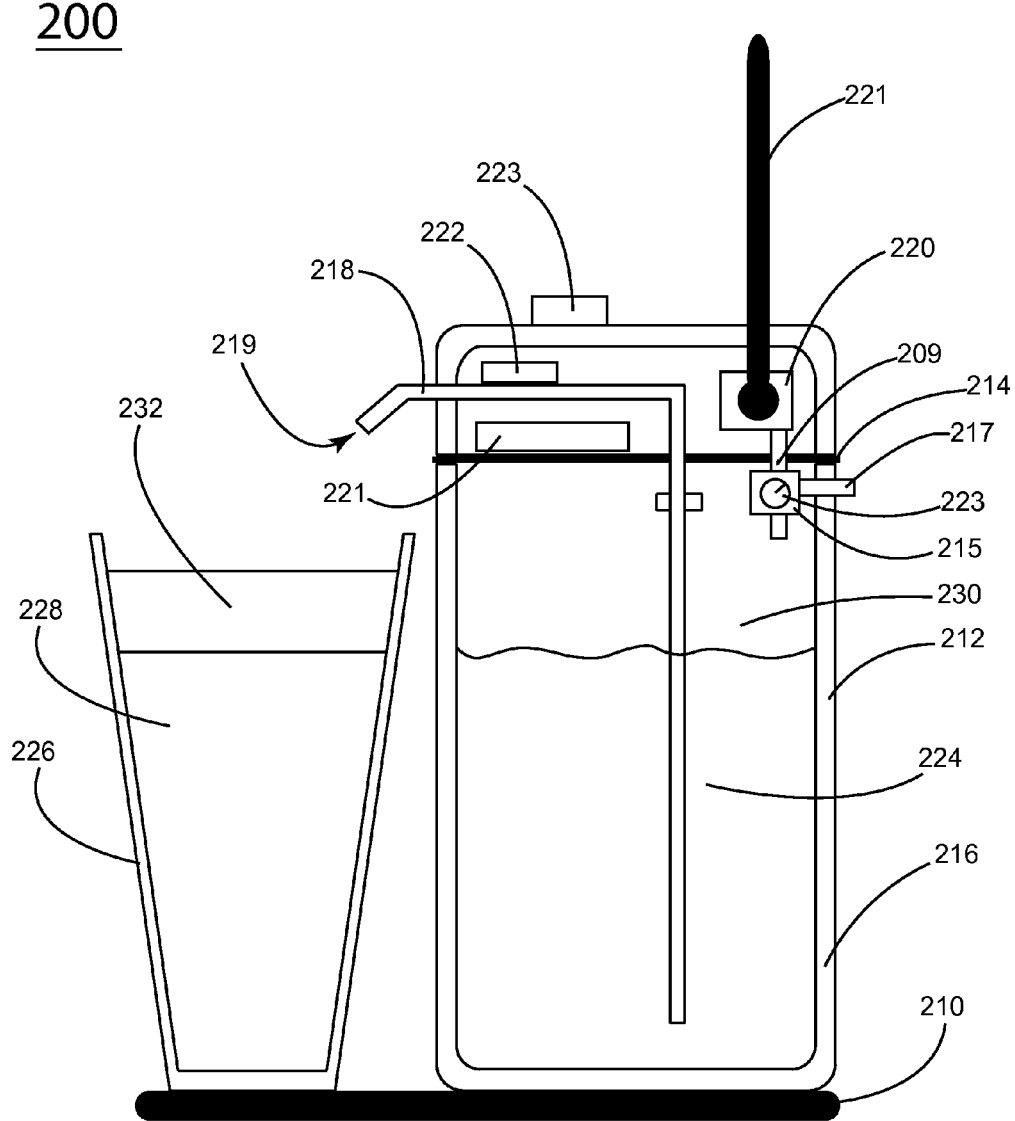
FIG. 2 is a diagram depicting the arrangement of components of an example embodiment.

Referring to FIG. 2, an example embodiment 200 comprises a base 210 engaged with a body 212 that is further engaged by way of a gasket 214 with an upper housing 216. One skilled in the art will understand that there are a number of methods for securing the upper housing with the body such as methods including threaded or clamping closure methods.

The body 212 is a hollow chamber closed on all but one side. The open side is engaged with a gasket 214 which is further engaged with the upper housing. A conduit 218 extends from the proximal end in the interior of the body 212 where it is intended to be inserted into the liquid 224 to be dispensed, through the upper housing where the distal end forms a spout 219. The upper housing 216 contains a pumping lever 221, a power source 221, a pump 220, a valve 215, and a high frequency oscillation means, otherwise referred to as an oscillator 222.

A beverage 224 is poured into the body 212 and the proximal end of the conduit 218 is inserted into the beverage 224. The upper housing 216 is closed over the body 212 and sealed against the gasket 214. The valve 215 is moved to a position that closes the purge conduit 217 and opens the pump conduit 219, to allow air from the pump 220 into the interior of the body 212. The pump lever 225, is moved so as to pump air into the body 212. As the air pressure increases inside the body 212, the liquid in the beverage container 224 is moved through the conduit 218 by the property of displacement, and out the distal end, otherwise referred to as a spout 219, into the glass 226. When the user chooses to create a foamed liquid, a switch 223 is turned on, providing power from the power source 221 to the oscillator 222, thus powering the oscillator 222 that produces an oscillatory wave through the conduit 218 and hence through the carbonated liquid, thus causing it to foam. The oscillatory wave agitates the liquid, increasing the reaction between the carbon dioxide and the proteins and starches in the liquid producing foam 232 that floats on top of the dispensed liquid 228. The user may then move the valve 215 to the position wherein the purge conduit 217 is opened and conduit 219 is closed, so that the pressure in the body 212 exits through the purge conduit 217, thus returning the pressure inside the body 212 to that of the ambient environment.

Figure 3:
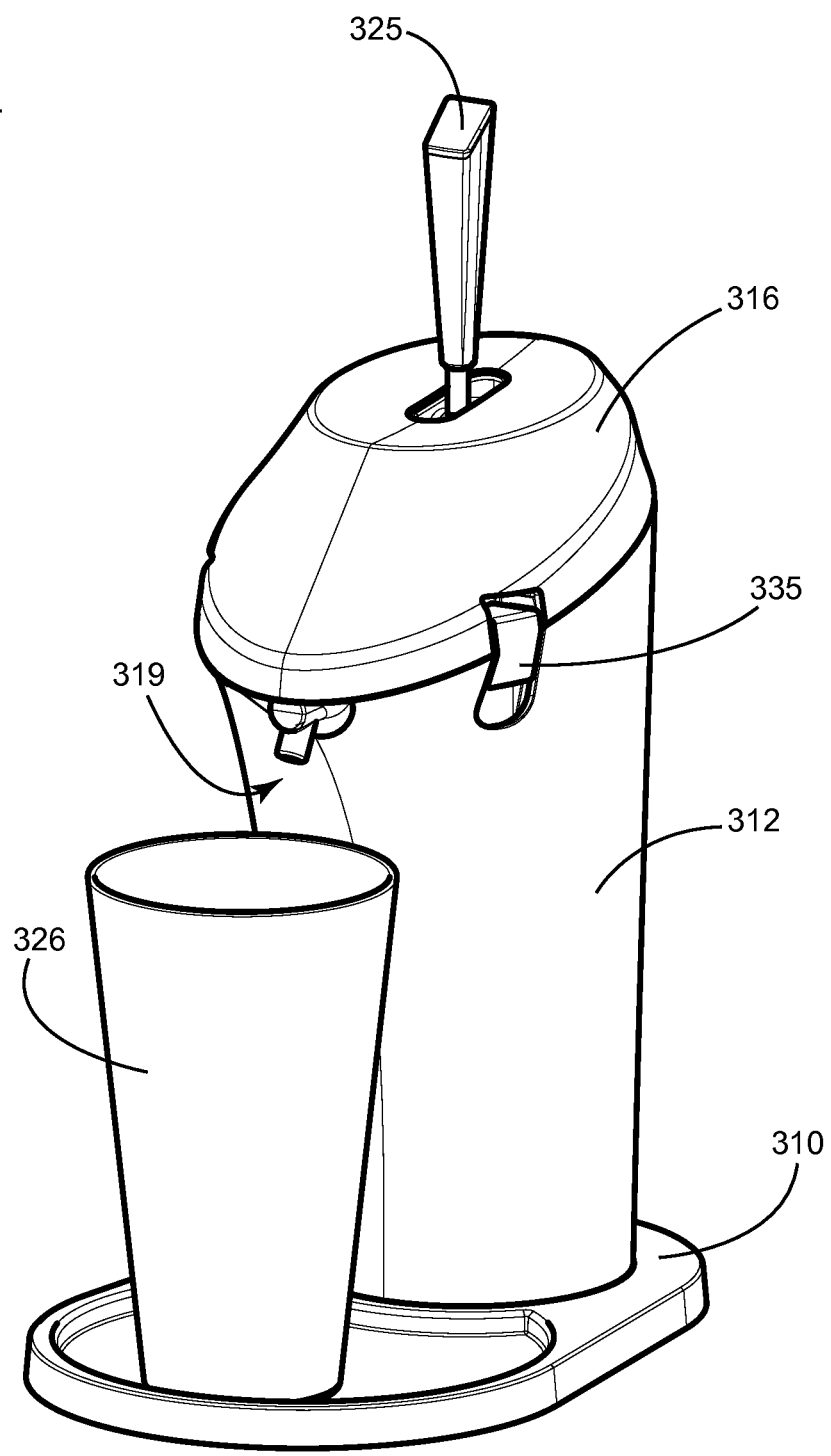
FIG. 3 is a perspective drawing of an iteration of the embodiment.

Referring to FIG. 3 an iteration of the embodiment is illustrated. A base 310 supports a vessel 326 and the body 312 of the embodiment. Clamps 315 engage the upper housing 316 with the body 312. An operation means, or lever 325 actuates the control circuit that in turn operates the internal components, illustrated in FIG. 4.

Figure 4:
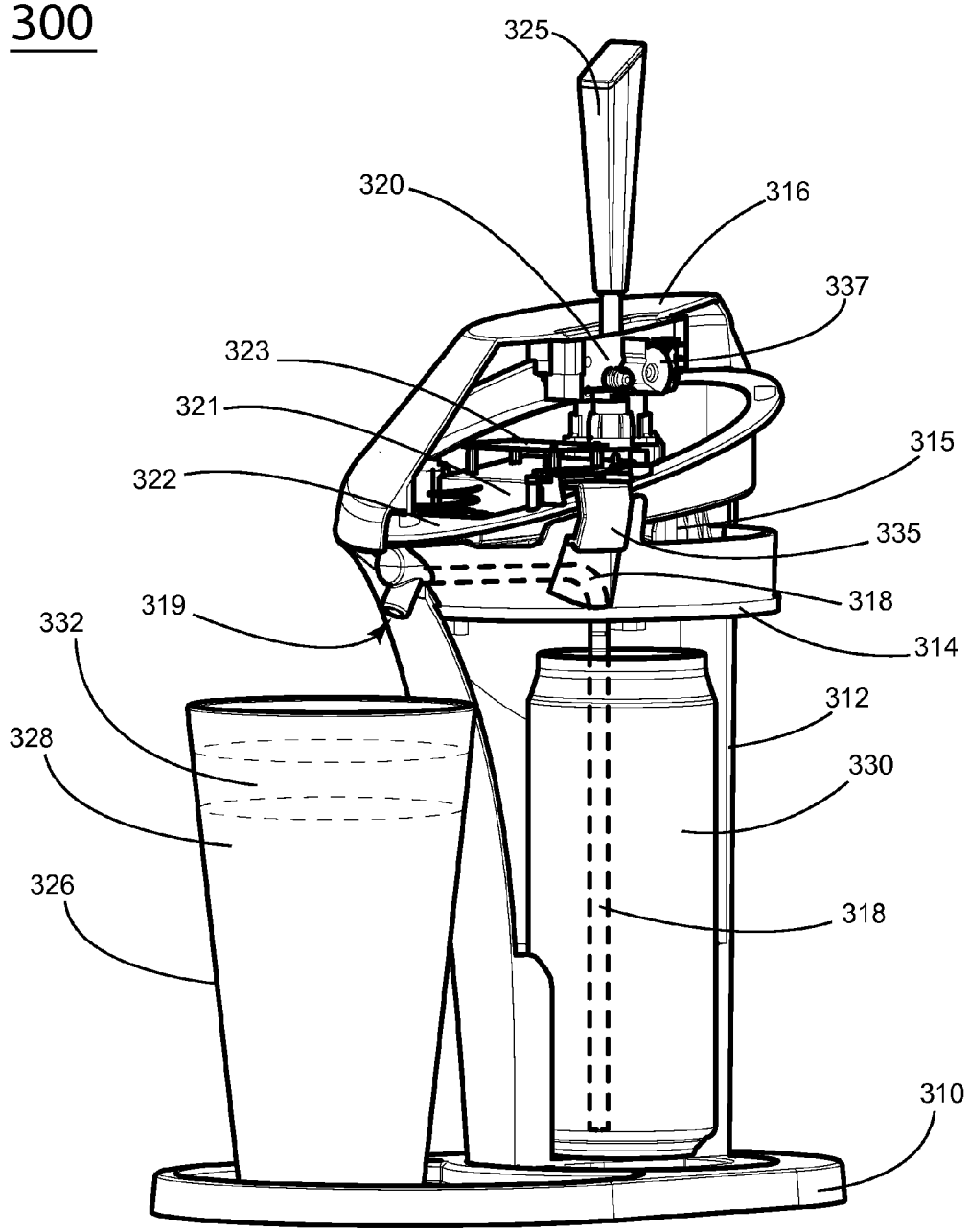
FIG. 4 is a partial section, perspective drawing of an iteration of the embodiment.

Referring to FIG. 4, an example embodiment 300 comprises a base 310 engaged with a body 312 that is further engaged by way of a gasket 314 with an upper housing 316. At least one clamping means 315 engages with a portion of the upper housing 316 and the body 312. One skilled in the art will understand that there are a number of methods for securing the upper housing with the body such as methods including threaded or clamping closure methods.

The body 312 is a hollow chamber closed on all but one side. The open side is engaged with a gasket 314 which is further engaged with the upper housing. A conduit 318 extends from the proximal end in the interior of the body 312 where it is intended to be inserted into a container 330 that holds a carbonated beverage to be dispensed, through the upper housing 316 where the distal end forms a spout 319. The upper housing 316 comprises a lever 325, a power source 321, a control circuit 323, a pump 320, a valve 315, and a high frequency oscillation means, otherwise referred to as an oscillator 322. One skilled in the art will understand that a control circuit and subsequently engaged switches, actuators, solenoid valves and the like are powered by a cord intended for engagement with a wall outlet or a battery operated power source.

A beverage in a container 330 is placed inside the body 312 and the proximal end of the conduit 318 is inserted into the beverage container 330. The upper housing 316 is closed over the body 312 and sealed against the gasket 314 by engaging clamps 334. Movement of the lever 325 actuates a switch 323 that engages the control circuit 323 that in turn moves the valve 315 to a position that closes a purge conduit and opens a pump conduit, to allow air from the pump 320 into the interior of the body 312. As the air pressure increases inside the body 312, the liquid in the beverage container 330 is moved through the conduit 318 by the property of displacement, and out the distal end, otherwise referred to as a spout 319, into the glass 326. When the user chooses to create a foamed liquid, the lever 325 is moved to a third position wherein a signal to the control circuit, provides power from the power source 321 to the oscillator 322, thus powering the oscillator 322 that produces an oscillatory wave through the conduit 318 and hence through the carbonated liquid, causing it to foam. The oscillatory wave agitates the liquid, increasing the reaction between the carbon dioxide and the proteins and starches in the liquid producing foam 332 that floats atop the dispensed liquid 328 in the glass 326. The user may then move the lever 325 to the final position, signaling the control circuit to open the valve 315 to purge the pressure from inside the body 312, thus returning the pressure inside the body 312 to that of the ambient environment.

Figure 5:
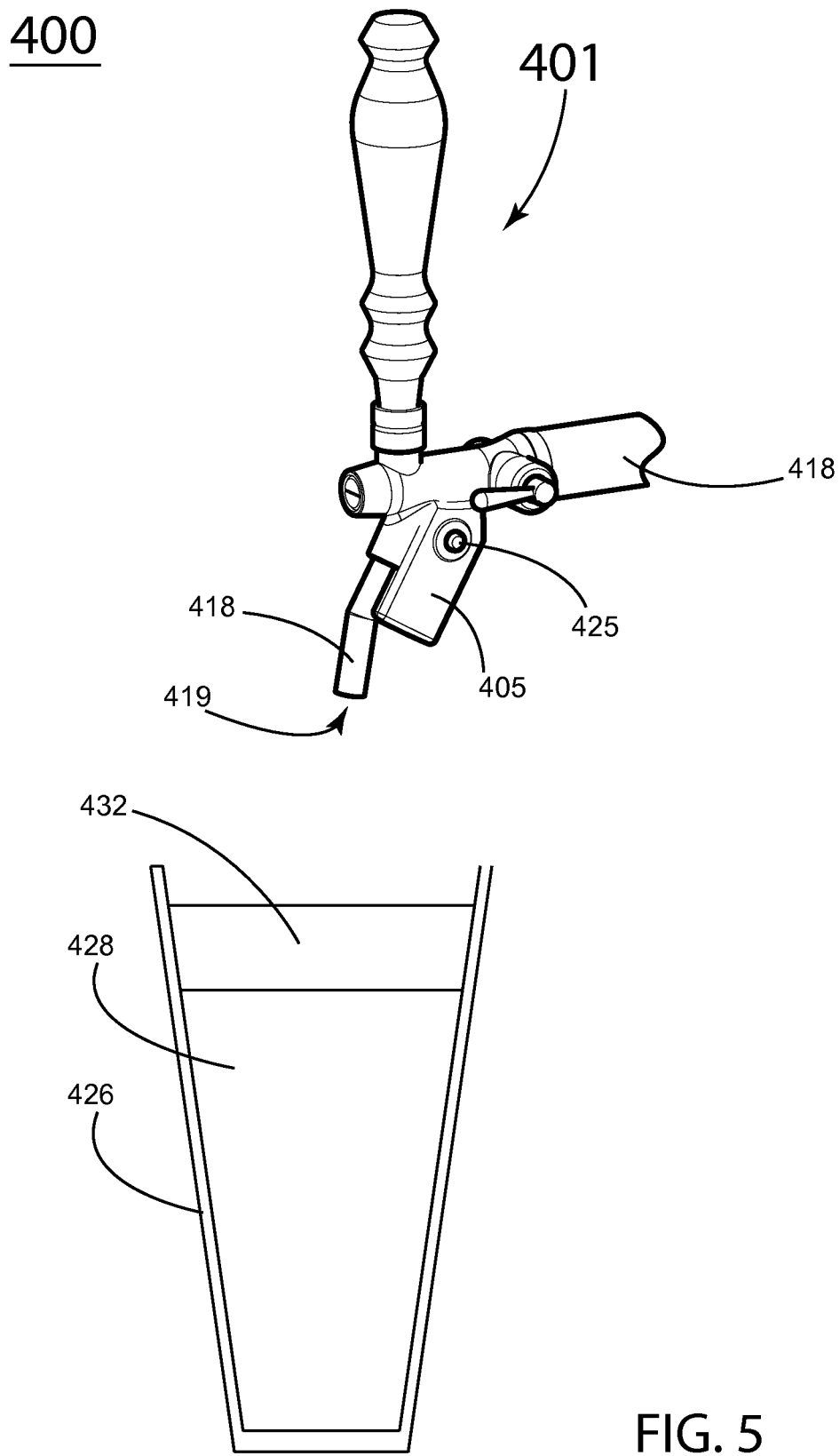
FIG. 5 is a perspective drawing of an iteration of the embodiment.
Figure 6:
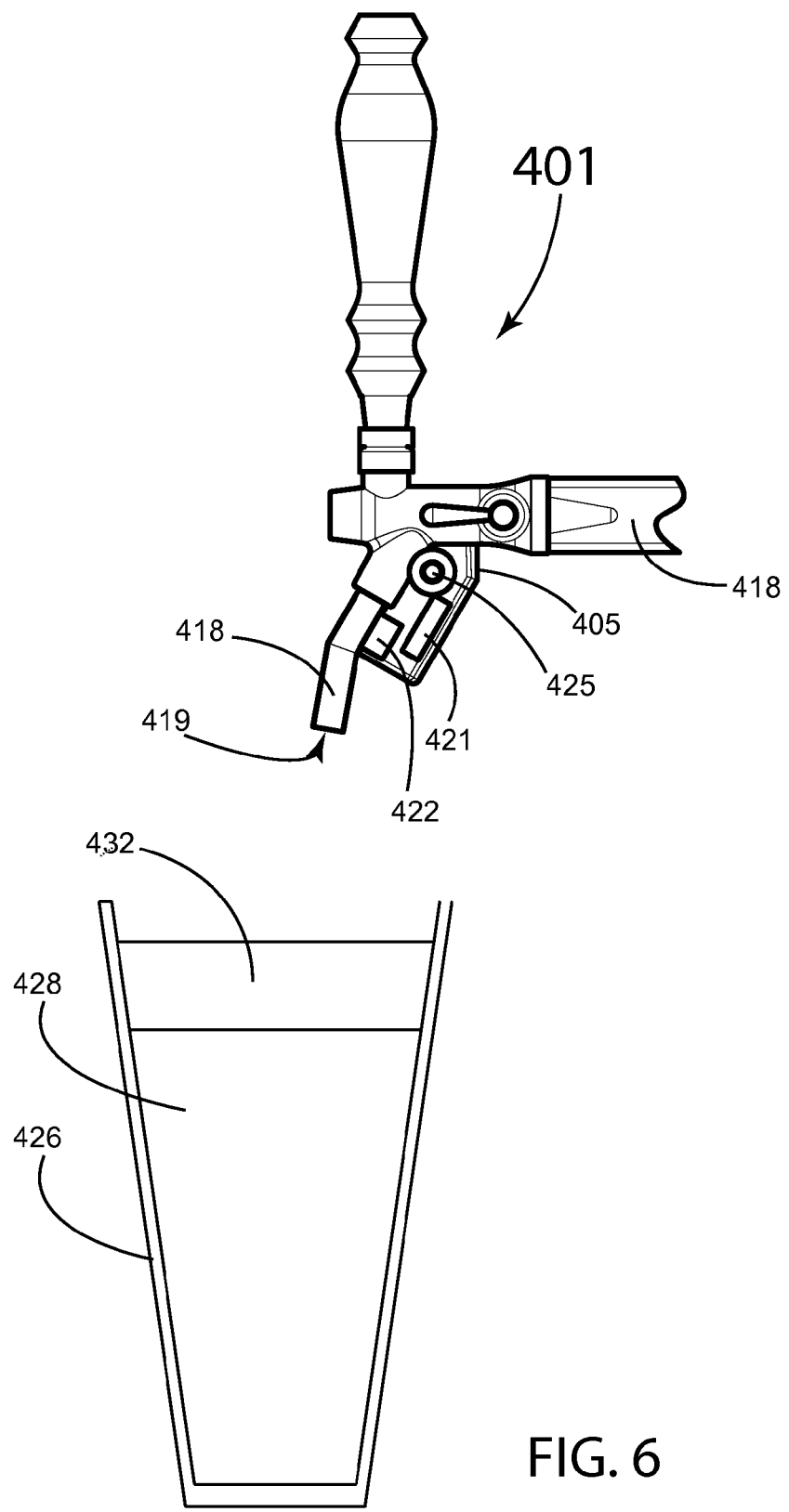
FIG. 6 is a partial section, side view of the iteration of FIG. 5.

Referring to FIG. 5 and FIG. 6, an iteration of the embodiment is illustrated in a perspective view in FIG. 5 and a side, section view in FIG. 6. The example embodiment is intended as an integral design to be engaged with a tap 401. The tap 401 comprises a valve that allows carbonated liquid to flow from a pressurized vessel such as a keg, along a conduit 418 to the spout 419. The embodiment includes a housing 405 that contains a power supply 421 that supplies power to an oscillator 422, through momentary switch 425. The oscillator produces an oscillatory wave through the conduit 418 and hence through the carbonated liquid, causing it to foam. The oscillatory wave agitates the liquid, increasing the reaction between the carbon dioxide and the proteins and starches in the liquid producing foam 432 that floats atop the dispensed liquid 428 in the glass 426.

Figure 7:
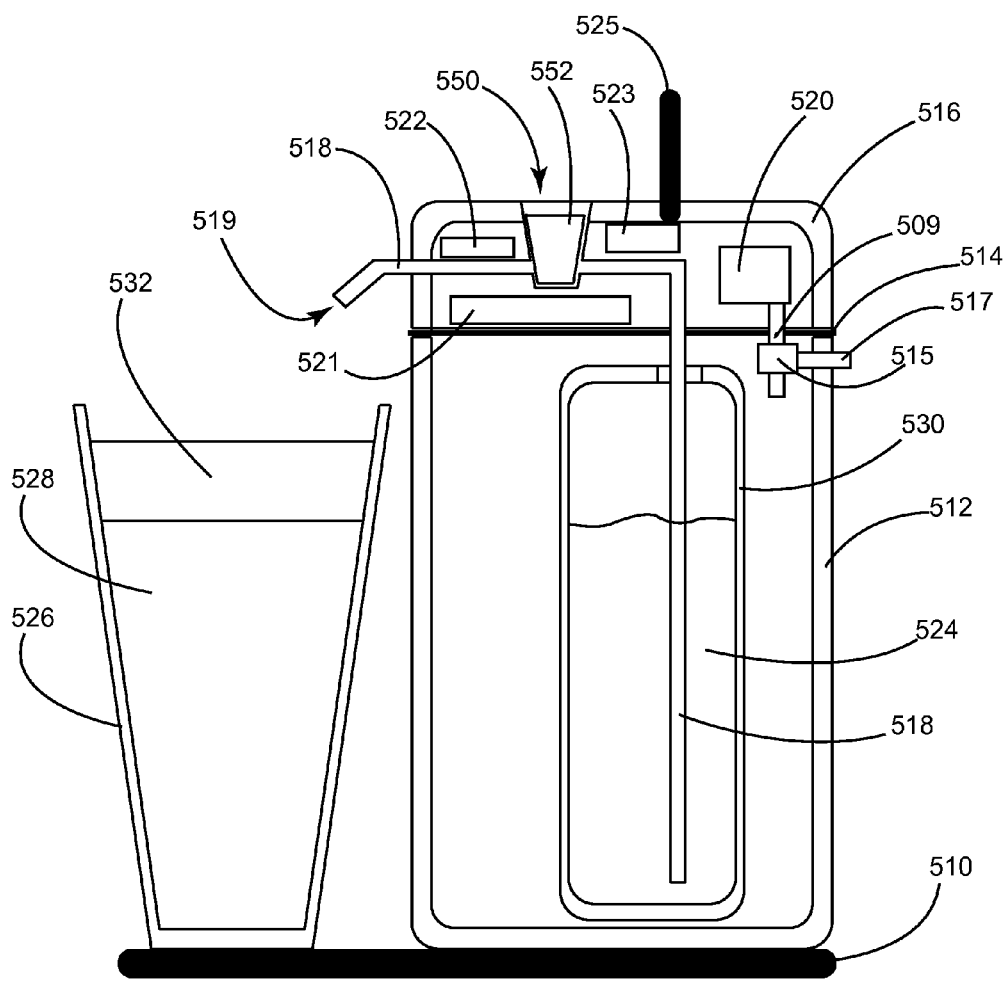
FIG. 7 is a diagram depicting the arrangement of components of an example embodiment.

Referring to FIG. 7, an example embodiment 500 comprises a base 510 engaged with a body 512 that is further engaged by way of a gasket 514 with an upper housing 516. One skilled in the art will understand that there are a number of methods for securing the upper housing with the body such as methods including threaded or clamping closure methods.

The body 512 is a hollow chamber closed on all but one side. The open side is engaged with a gasket 514 which is further engaged with the upper housing. A conduit 518 extends from the proximal end in the interior of the body 512 where it is intended to be inserted into the liquid 524 to be dispensed, through the upper housing where the conduit 518 passes through a vessel 550 that may contain a filter or flavored infusion pod 552 wherein it continues to the distal end that forms a spout 519. The upper housing 516 contains a control lever 525, a power source 521, a pump 520, a valve 515, a high frequency oscillation means, otherwise referred to as an oscillator 522, and a control circuit 523. The control circuit 523 directs power to the aforementioned components to achieve the following described method.

A beverage container 530 is inserted into the body 512 and the conduit 518 is inserted into the beverage 524. The upper housing 516 is closed over the body 512 and sealed against the gasket 514. The operation means or lever 525, is moved to the position relative to the dispensing of the liquid. The control circuit 522 turns the valve 515 to allow air from the pump 520 into the interior of the body 512. The control circuit 522 then turns on the pump 520 that transfers air into the interior of the body 512. As the air pressure increases inside the body 512, the liquid in the beverage container 524 is moved through the conduit 518 by the property of displacement, and through the vessel 550 where it interacts with the filter and/or infusion pod 552 and continues out the spout 519, into the glass 526. When the user chooses to create a foamed liquid, the lever 525 is moved to the position relative to the foaming of the liquid. The control circuit 523 turns on the oscillator 522 that produces an oscillatory wave through the conduit 518 and hence through the carbonated liquid, thus causing it to foam. The oscillatory wave agitates the liquid, increasing the reaction between the carbon dioxide and the proteins and starches in the liquid producing foam 532 that floats on top of the dispensed liquid 528. When the beverage and foam have been dispensed, the lever 525 is moved to a neutral position wherein the control circuit 523 switches the valve 515 to open the purge conduit 517 so that the pressure in the body 512 exits through the purge conduit 517, thus returning the pressure inside the body 512 to that of the ambient environment. The upper housing is opened and the empty beverage container 530 removed. One skilled in the art understands that an infusion pod 552 may contain flavors or additives for enhancing the liquid and foam or for enhancing only the liquid or only the foam dispensed. One skilled in the art understands that an infusion pod may be replaced with a filter for the purpose of removing contaminants from the dispensed liquid.

Although embodiments describe liquid under pressure, one skilled in the art can understand that the invention may also work with liquid flowing through a conduit at ambient pressure.

A more complete understanding of the components, processes, and apparatuses disclosed herein can be obtained by reference to the accompanying figures. These figures are intended to demonstrate the present disclosure and are not intended to show relative sizes and dimensions or to limit the scope of the disclosed embodiment(s). In particular, the figures provided herein are not necessarily to scale and, in certain views, parts may be exaggerated for clarity.

Although specific terms are used in the following description, these terms are intended to refer only to particular structures in the drawings and are not intended to limit the scope of the present disclosure. It is to be understood that like numeric designations refer to components of like function.

The term "about" or "approximately" when used with a quantity includes the stated value and also has the meaning dictated by the context. For example, it includes at least the degree of error associated with the measurement of the particular quantity. When used in the context of a range, the term "about" or "approximately" should also be considered as disclosing the range defined by the absolute values of the two endpoints. For example, the range "from about 2 to about 4" or "from approximately 2 to approximately 4" also discloses the range "from 2 to 4."

While example embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. An apparatus for producing foam from a carbonated beverage while dispensing said beverage comprising:
    a sealable container; and
    a conduit having a proximal end inside the sealable container and a distal end outside the sealable container; and
    a power source; and
    at least one switch; and
    a control circuit; and
    at least one valve engaged with said sealable container; and
    a pump; and
    a sonic oscillator proximal to said conduit; wherein
    the apparatus is configured to receive a carbonated liquid into the sealable container providing the proximal end of the conduit within the carbonated liquid; and said control circuit, powered by the power source, engaged by the at least one switch to engage said pump thus providing increased pressure in the sealed container and transference of the carbonated liquid through the conduit; and upon engagement of an additional switch, said control circuit sends power and so engages said sonic oscillator providing oscillating sonic waves through the carbonated liquid in the conduit causing the carbonated liquid to foam as it leaves the distal end of the conduit; subsequently, said control circuit opening said at least one valve that is engaged with the sealable container to release pressure from the sealable container.

2. The apparatus of claim 1 wherein the carbonated liquid is provided into the sealable container in a glass bottle.

3. The apparatus of claim 1 wherein the carbonated liquid is provided into the sealable container in a can.

4. The apparatus of claim 1 wherein the carbonated liquid is provided into the sealable container in a carton.

5. The apparatus of claim 1 wherein the carbonated liquid is provided into the sealable container in a sealable pouch.

6. The apparatus of claim 1 wherein the carbonated liquid is provided directly into the sealable container.

7. The apparatus of claim 1 wherein the at least one switch is a momentary switch.

8. The apparatus of claim 1 wherein the sealable container comprises;
    an upper portion; and
    a lower portion; and
    a gasket between said upper and lower portions; and
    a clamp engaged between said upper and lower portions providing a closed air-tight seal when engaged.

9. The apparatus of claim 1 wherein the sonic oscillator is an ultrasonic piezoelectric transducer providing ultrasonic waves that translate through the conduit and permeate the carbonated liquid.

10. The apparatus of claim 1 wherein the conduit is interrupted by a vessel.

11. The apparatus of claim 10 wherein the vessel contains a filter.

12. The apparatus of claim 10 wherein the vessel contains a permeable container filled with soluble material.

13. An apparatus for producing foam from a carbonated beverage while dispensing said beverage comprising:
    a sealable container; and
    a conduit having a proximal end inside the sealable container and a distal end outside of the sealable container; and
    at least one valve engaged with said sealable container; and
    a pump, and
    a sonic oscillator proximal to said conduit; wherein
    the device is configured to receive a carbonated liquid into the sealable container providing the proximal end of the conduit within the carbonated liquid; engaging said pump thus providing increased pressure in the sealed container and transference of the carbonated liquid through the conduit; and engaging said sonic oscillator providing oscillating sonic waves through the carbonated liquid in the conduit thus causing the carbonated liquid to foam as it exits the distal end of the conduit; subsequently, opening said at least one valve releases pressure from within the sealable container.

14. The apparatus of claim 13 wherein said pump is a manual pump.

15. The apparatus of claim 13 wherein said pump is a motorized pump with a manually operated switch.

16. The apparatus of claim 13 wherein said valve is a manually operated valve.

17. The apparatus of claim 13 wherein said valve is a motorized valve with a manually operated switch.

18. An apparatus for dispensing carbonated liquid from a tap into a vessel providing a portion of the carbonated liquid as foam atop the dispensed liquid, the apparatus comprising;
    a tap comprising a conduit, having a spout at the end of said conduit and a valve for controlling flow through said conduit; and
    said conduit of said tap extending from a pressurized vessel to the spout; and
    a housing engaged with said conduit; and
    the housing containing:
        a momentary switch; and
        a power source; and
        a sonic oscillator proximal to the conduit; and
        the power source providing power to the sonic oscillator; and
    the switch controlling the flow of power to the sonic oscillator; and
    a vessel for receiving dispensed liquid from the spout.

* * * * *